Feb. 7, 1967  M. E. GREENE  3,302,501
METHOD OF FIBRILLATING PLASTIC FILM BY PASSING
THE FILM THROUGH ROTATING PIERCING MEANS
Filed Sept. 24, 1965

INVENTOR
M. E. GREENE
BY
Young + Quigg
ATTORNEYS

United States Patent Office

3,302,501
Patented Feb. 7, 1967

3,302,501
METHOD OF FIBRILLATING PLASTIC FILM BY PASSING THE FILM THROUGH ROTATING PIERCING MEANS
Max E. Greene, Bartlesville, Okla., assignor to Phillips Petroleum Company, a corporation of Delaware
Filed Sept. 24, 1965, Ser. No. 490,024
6 Claims. (Cl. 83—2)

The invention relates to a method for fibrillating plastic film and the product thereof.

Heretofore, plastic film has been fibrillated by passing same over a stationary brush or similar shredding means. Shredding methods produce unevenly fibrilliated or fibrous articles and tend to tear off fibers from the fibrillated product which fibers then collect on the shredding means and after a period of time require shutdown of the apparatus to remove these collected, torn off fibers.

Quite surprisingly, it has now been found that oriented plastic film can be fibrillated by piercing the film through its thickness in a plurality of points without shredding the film, i.e. moving the piercing means longitudinally or laterally through the film as it is pierced.

It has also been found that a film can be prepared for fibrillation without actually fibrillating that film by only partially penetrating the film thickness at a plurality of points. This partial penetration then allows for subsequent conventional splitting to be carried out at a different time and/or place to produce a more uniformly fibrillated product.

The fibrillated article produced according to this invention has a surprisingly uniformly split configuration, i.e. has a more uniform fibrous network of fibroid segments forming the web and said segments being randomly associated by smaller fibers joining the segments together.

Accordingly, it is an object of this invention to provide a new and improved method for fibrillating film. It is another object of this invention to provide a fibrillated product having a more uniform network of fibroid segments joined by smaller individual fibers.

Other aspects, objects, and the several advantages of this invention will be readily apparent to those skilled in the art from the description, the drawings, and the appended claims.

Figure 1:
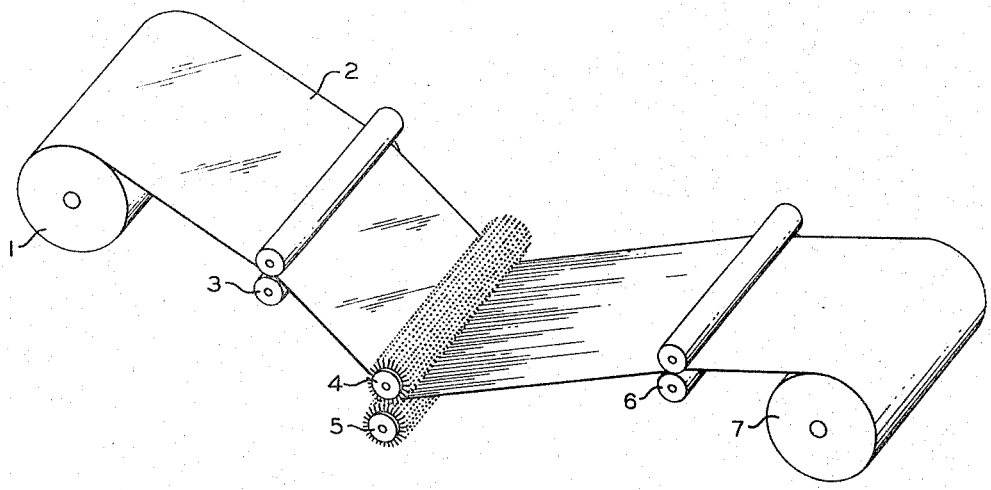

In FIGURE 1 there is shown a system for carrying out the method of this invention.

Figure 2:
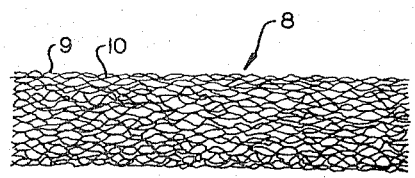

In FIGURE 2 there is shown a fibrillated product of this invention.

In FIGURE 1 there is shown a roll of oriented plastic film 1 from which the film 2 passes over a guide roller 3 and between two opposing wire brushes 4 and 5 which brushes are spaced one from the other so that the film passing therebetween is pierced by the wires of at least one of the brushes. The fibrillated product passes from between wire brushes 4 and 5 over guide roller 6 and is rolled up on roll 7 for subsequent disposition as desired.

In FIGURE 2 there is shown a sample of the fibrillated product produced by the apparatus and method of FIGURE 1 which product is generally denoted as 8. The product comprises fibroid segments 9 of substantially uniform thickness and spacing, the segments being randomly joined one to the other by smaller individual fibers 10. Thus, it can be seen that a surprisingly uniform network of non-woven fibers is produced and that this fibrillated product can be made continuously, economically, and in large quantities.

Generally, any orientable plastic film can be employed in this process. The film can be in a uniaxially, biaxially, or other multi-axially oriented condition. The film can be oriented in any conventional manner well known to those skilled in the art including super-cooling the film and then orienting same by stretching and the like or heating the film to a temperature below that at which the film is in the molten state and then stretching same. By orientation, what is generally meant to be covered is deforming, e.g. stretching the film below that temperature at which the film is substantially in the molten state, to thereby increase the strength of the film at least in the direction in which it is deformed.

Generally, films of 1-olefins having from 2 to 8 carbon atoms per molecule which have been oriented by stretching in at least one direction so that the film after stretching is at least 3 times longer in the direction of stretching than it was before stretching, i.e. 3 to 1, can be used. When film of polyethylene which has density of at least about 0.94 gram per cubic centimeter is employed the ratio of length in the stretched direction to original length should be at least 4 to 1 and when polypropylene is employed this ratio should be at least 6 to 1. Polymers of 1-olefins can be made in any conventional manner. A particularly suitable method is that disclosed in U.S. Patent 2,853,741. The film can be made from the polymers in any conventional manner such as by extrusion, casting, flattening blown tubing, and the like.

Other conventional plastic films that can be employed in this invention include blends and copolymers of 1-olefins as above-described with each other and with other polymers such as nylon, polyesters, polyvinyl alcohol, acrylic polymers, polyvinyl chloride, polyvinyl acetate, polyvinylidene chloride, and the like. Of course, homopolymers of the 1-olefins and other materials described can also be employed as well as copolymers. A stretch or orientation ratio of at least 3 to 1 can also be employed with these plastic films.

The film can be of any length and width and substantially any thickness, the minimum thickness of the film being only that which will produce a substantially self-sustaining film and the maximum thickness being dictated only by the piercing capability of the piercing means employed. Preferably, the thickness of the film will vary from that which is sufficient to form a self-sustaining film to 6 mils. Thicker films can be treated by using heavier duty piercing apparatus or by passing the same film through the same piercing apparatus two or more times. By repeated passes through the same piercing apparatus lighter duty piercing means can be employed to effectively fibrillate thicker and/or tougher plastic films than can be accommodated on a single pass.

Also, the spacing of the piercing means from one another can be adjusted so that each individual piercing means does not completely pass through the film or lighter duty piercing means can be employed with thicker or tougher films so that in any event the film is only partially pierced or penetrated. This partially pierced film is then, in effect, pretreated for subsequent conventional splitting such as by rolling and/or stretching the film between two elastomeric segments to form a uniformly fibrillated product similar to that shown in FIGURE 2.

The piercing of the film can be accomplished by any means which contains a plurality of points extending from the surface thereof. Preferably, opposed rotatable piercing means are employed so that the method can be made continuous and so that double piercing can be effected. A presently preferred piercing means are opposed rotatable wire brushes which are spaced from one another so that the film is forced in among the wires of one brush by the opposing brush thereby effecting penetration of the film by at least the wires of one of the brushes and oftentimes by wires of both the brushes. The wire brushes or other piercing means employed are rotated or moved in the same direction as the film is moving, if the method is continuous, and at the same speed as the film advances to thereby effect substantially only piercing of the film and no shredding of same.

EXAMPLE I

Blown tubing of a 2-mil wall thickness and composed of a homopolymer of polyethylene having a density of 0.96 gram per cubic centimeter and a melt index of 0.2 was flattened to form a 4-mil thick film 12 inches wide.

The film was then stretched at 240° F. until the stretched length was 6 times that of the original prestretched length, i.e. stretched 500 percent.

The film was then passed between two opposed wire brushes at a speed of 120 feet per minute, the wire brushes having a peripheral speed of substantially 120 feet per minute. Each brush had a diameter to the ends of the wire bristles of 4½ inches and was 5 inches wide. The wire bristles of each brush had diameters of about 8 mils and lengths of about ¾ inch, while the density of bristles per square inch of peripheral brush surface was approximately 3200.

After one pass between these wire brushes an extremely uniformly fibrillated product was obtained substantially of the configuration and uniform network shown in FIGURE 2.

EXAMPLE II

Blown tubing having a 2-mil wall thickness and composed of a homopolymer of polypropylene having a melt flow of from 2.5 to 4 (ASTM D 1238–62T, Condition L, grams/10 minutes) and a flexural modulus equal to or greater than 200,000 (ASTM D 790–63, 73° F., p.s.i.) was flattened to form a 4-mil thick film 12 inches wide.

The film was stretched at a temperature of 250° F. until the length in the stretched direction was 7½ times of the original unstretched length, i.e. 650 percent.

The film was then passed between the opposed wire brushes described in Example I at a speed of 60 feet per minute, the wire brushes being moved at a similar peripheral speed.

An extremely uniformly fibrillated product similar to that of Example I was obtained which product also had a uniform network substantially the same as that shown in FIGURE 2.

Reasonable variations and modifications are possible within the scope of this disclosure without departing from the spirit and scope thereof.

I claim:

1. A method for fibrillating an oriented plastic film comprising (a) passing said film between an opposing pair of rotating piercing means, said rotating means having a plurality of piercing means on their periphery, (b) rotating said rotating means so that said piercing means rotate at a peripheral speed substantially the same as the speed at which said film passes therebetween, (c) piercing said film without shredding same by passing said piercing means through said film substantially parallel to the thickness axis thereof and not substantially perpendicular to said thickness axis.

2. The method according to claim 1 wherein said film is composed of at least one of homopolymers and copolymers and blends thereof of 1-olefins having from 2 to 8 carbon atoms per molecule, said films being oriented so that the oriented length is at least 3 times that of the unoriented length.

3. The method according to claim 1 wherein said film is at least one selected from the group consisting of polyethylene having a density of at least 0.94 gram per cubic centimeter and which has an oriented length of at least four times that of the unoriented length, and polypropylene having an oriented length of at least six times that of the unoriented length, and said film passes between opposed rotating wire brushes whose bristles slightly engage one another and both of which brushes rotate at a peripheral speed substantially the same as the speed of the film passing therebetween.

4. A method for pretreating a film for subsequent fibrillation comprising partially penetrating the film at a plurality of points by passing a plurality of piercing means into said film and withdrawing said piercing means therefrom without substantial movement of said piercing means in a direction substantially perpendicular to the thickness axis of said film.

5. The method according to claim 4 wherein said film is passed between a pair of opposing wire brushes whose bristles engage slightly and both of which brushes rotate at a peripheral speed substantially the same as the speed of the film passing therebetween.

6. The method according to claim 4 wherein said film is composed of at least one of homopolymers, copolymers, and blends thereof of 1-olefins having from 2 to 8 carbon atoms per molecule.

References Cited by the Examiner

UNITED STATES PATENTS

| | | | |
|---|---|---|---|
| 528,696 | 11/1894 | Sergeant | 83—660 |
| 2,428,810 | 10/1947 | Powell | 29—121 |
| 2,853,741 | 9/1958 | Costa et al. | 264—280 |
| 3,009,848 | 11/1961 | Simon | 83—19 |
| 3,074,303 | 1/1963 | Waters | 83—347 |
| 3,126,777 | 3/1964 | Shabram | 83—347 |

ANDREW R. JUHASZ, *Primary Examiner.*

WILLIAM W. DYER, Jr., *Examiner.*